(12) United States Patent
Schwarber et al.

(10) Patent No.: US 12,481,966 B2
(45) Date of Patent: Nov. 25, 2025

(54) SYSTEMS AND METHODS FOR ASSOCIATING VESSELS WITH USER ACCOUNTS

(71) Applicant: THE COCA-COLA COMPANY, Atlanta, GA (US)

(72) Inventors: Joshua Casey Schwarber, Decatur, GA (US); Allen Lineberry, Liberty, NC (US); Benjamin John Kingston, Suwanee, GA (US); David Carrewyn, Atlanta, GA (US); Matthew Baker, Atlanta, GA (US); Axel Kling, Newnan, GA (US); Patrick Etesse, Brussels (BE)

(73) Assignee: THE COCA-COLA COMPANY, Atlanta, GA (US)

( * ) Notice: Subject to any disclaimer, the term of this patent is extended or adjusted under 35 U.S.C. 154(b) by 64 days.

(21) Appl. No.: 18/017,772

(22) PCT Filed: Jul. 23, 2021

(86) PCT No.: PCT/US2021/043006
§ 371 (c)(1),
(2) Date: Jan. 24, 2023

(87) PCT Pub. No.: WO2022/020737
PCT Pub. Date: Jan. 27, 2022

(65) Prior Publication Data
US 2023/0289747 A1    Sep. 14, 2023

Related U.S. Application Data

(60) Provisional application No. 63/056,180, filed on Jul. 24, 2020.

(51) Int. Cl.
G06Q 30/02        (2023.01)
G06K 19/06       (2006.01)
(Continued)

(52) U.S. Cl.
CPC ....... G06Q 10/30 (2013.01); G06K 19/06009 (2013.01); G06K 19/0723 (2013.01); G06Q 30/0215 (2013.01); *G06K 7/10435* (2013.01)

(58) Field of Classification Search
CPC .... G06Q 10/30; G06Q 30/0215; G06Q 10/08; G06Q 30/06; G06Q 30/0207–30/0277;
(Continued)

(56) References Cited

U.S. PATENT DOCUMENTS 8,979,539 B1 *  3/2015  Snyder .................. G01G 21/00
                                                     434/236
9,864,889 B2 *  1/2018  Tonnelier ............. G06K 7/1413
(Continued)

FOREIGN PATENT DOCUMENTS

EP      3629255 A1     4/2020
JP   2001341814 A    12/2001
(Continued)

OTHER PUBLICATIONS

International Search Report and Written Opinion issued in PCT/US2021/043006, mailed Jan. 27, 2022.
(Continued)

Primary Examiner — Thuy N Nguyen
(74) Attorney, Agent, or Firm — Meunier Carlin & Curfman LLC (57) ABSTRACT

A vessel is assigned a unique vessel identifier (620). Before or after the vessel is filled, the vessel identifier is encoded into a machine-readable code that is printed or etched onto the vessel (630; 640). The code may have the property that it can be quickly read by a scanner from a variety of different angles and vessel orientations. When the vessel is sold to a user, the user may scan the machine-readable code (or a different code placed on a label associated with the vessel) using a smartphone (710), and the unique vessel identifier is (Continued)

linked to a user account associated with the user (740). Later, when the user places the empty vessel in the recycling stream, a scanner or camera placed in the recycling facility scans or captures the machine-readable code on the vessel and extracts the vessel identifier from the code (810; 820).

20 Claims, 9 Drawing Sheets (51) Int. Cl.
    *G06K 19/07*     (2006.01)
    *G06Q 10/30*     (2023.01)
    *G06Q 30/0207*     (2023.01)
    *G06K 7/10*     (2006.01)

(58) Field of Classification Search
CPC ......... G06K 19/06009; G06K 19/0723; G06K 7/10435; H04W 4/029; H04W 4/80; Y02W 90/00
See application file for complete search history.

(56) References Cited

U.S. PATENT DOCUMENTS

| | | | |
|---|---|---|---|
| 11,524,842 B2* | 12/2022 | Sridhar | G06Q 10/30 |
| 11,538,302 B2 | 12/2022 | Huang et al. | |
| 2008/0061125 A1* | 3/2008 | Langlois | G06Q 10/08 340/572.1 |
| 2010/0161397 A1* | 6/2010 | Gauthier | G01C 21/3605 715/709 |
| 2011/0108627 A1 | 5/2011 | Bathelet et al. | |
| 2011/0225098 A1* | 9/2011 | Wolff | G06Q 30/02 705/308 |
| 2012/0322380 A1* | 12/2012 | Nannarone | G08B 21/0275 455/67.11 |
| 2015/0024523 A1* | 1/2015 | Virtanen | H01Q 1/2208 118/620 |
| 2015/0154568 A1* | 6/2015 | Gu | G06Q 10/30 705/308 |
| 2017/0011362 A1* | 1/2017 | Whitman | G06Q 10/08 |
| 2017/0061350 A1* | 3/2017 | Smith | G06Q 10/08 |
| 2017/0124643 A1* | 5/2017 | Haimi | G06K 19/06009 |
| 2017/0200135 A1* | 7/2017 | Whitman | G06Q 30/04 |
| 2018/0012311 A1* | 1/2018 | Small | G06Q 20/389 |
| 2018/0016096 A1* | 1/2018 | Krishnamurthy | B65F 1/14 |
| 2018/0065155 A1* | 3/2018 | Ripley | G06V 30/424 |
| 2018/0078065 A1* | 3/2018 | Cheatham | A47G 19/2227 |
| 2018/0181786 A1* | 6/2018 | Gao | G06K 7/1413 |
| 2019/0288845 A1* | 9/2019 | Wah | G06F 21/88 |
| 2019/0306385 A1 | 10/2019 | Sharma et al. | |
| 2019/0370758 A1* | 12/2019 | Hauser | G06Q 10/30 |
| 2019/0392458 A1 | 12/2019 | Stonehouse et al. | |
| 2020/0034799 A1* | 1/2020 | Wong | H04L 67/125 |
| 2020/0053839 A1* | 2/2020 | Clark | H05B 6/065 |
| 2020/0143334 A1* | 5/2020 | Kayara | G06Q 10/087 |
| 2020/0189844 A1* | 6/2020 | Sridhar | G06Q 30/0226 |
| 2020/0364736 A1* | 11/2020 | Yousif | G06Q 10/30 |
| 2021/0001377 A1* | 1/2021 | Sutton | G06V 10/82 |
| 2021/0012605 A1* | 1/2021 | Yamine | B65F 1/1484 |
| 2021/0272074 A1* | 9/2021 | Peacemaker | G06Q 10/30 |
| 2021/0352192 A1* | 11/2021 | Sharma | H04N 21/23892 |
| 2022/0005002 A1* | 1/2022 | Graf von Stauffenberg | B29B 17/02 |
| 2022/0161298 A1* | 5/2022 | Kumar | B07C 5/342 |

FOREIGN PATENT DOCUMENTS

| | | | |
|---|---|---|---|
| JP | 2006285540 A | | 10/2006 |
| WO | 2013187686 A1 | | 12/2013 |
| WO | 2016202827 A1 | | 12/2016 |
| WO | 2019180438 A2 | | 9/2019 |
| WO | 2019224207 A1 | | 11/2019 |
| WO | 2019224208 A1 | | 11/2019 |
| WO | 2019246342 A1 | | 12/2019 |
| WO | WO-2020136379 A1 * | | 12/2019 |

OTHER PUBLICATIONS

Extended European Search Report issued in EP21846122.6, mailed Jul. 31, 2024.

* cited by examiner

SYSTEMS AND METHODS FOR ASSOCIATING VESSELS WITH USER ACCOUNTS

CROSS-REFERENCE TO RELATED APPLICATIONS

This application is a U.S. national phase entry under 35 U.S.C. § 371 of International Application No. PCT/US2021/043006, filed on Jul. 23, 2021, which claims priority to and the benefit of U.S. Provisional Patent Ser. No. 63/056,180, filed on Jul. 24, 2020, both of which are hereby incorporated in their entireties.

BACKGROUND

The benefits of recycling vessels, such as bottles and cans, are well known. However, many vessels are thrown into the trash, rather than recycled every year. This may be due to several factors such as a lack of public recycling receptacles and difficulties or costs associated with maintaining separate trash and recycling receptacles in the home and in the workplace.

One solution to this problem is known as the reverse vending machine. Users deposit used vessels in the vending machine, and the machine provides a reward to the users based on the number of used vessels that were deposited. The rewards may include coupons, discounts, or cash rewards.

However, one problem associated with reverse vending machines is that they require users to travel to the location associated with the reverse vending machine to recycle their vessels. In addition, users may be forced to store their used vessels between trips to the location of the vending machine and may have to wait in line at the location while others deposit their used vessels in the machine. This may be inconvenient for many users which may lead to infrequent recycling.

Accordingly, there is a need to incentivize users to recycle their vessels without putting any additional burdens on the users.

SUMMARY

A vessel, such as plastic bottle or aluminum can, is assigned a unique vessel identifier. Before or after the vessel is filled, the vessel identifier is encoded into a machine-readable code that is printed or etched onto the vessel. The code may have the property that it can be quickly read by a scanner from a variety of different angles and vessel orientations. When the vessel is sold to a user, the user may scan the machine-readable code (or a different code placed on a label associated with the vessel) using a smartphone, and the unique vessel identifier is linked to a user account associated with the user. Later, when the user places the empty vessel in the recycling stream, a scanner or camera placed in the recycling facility scans or captures the machine-readable code on the vessel and extracts the vessel identifier from the code. Because the vessel corresponding to the vessel identifier has now been verified as being recycled, a reward or incentive may be provided to the user account linked to the vessel identifier.

The disclosed systems and methods provide the following advantages. First, the disclosed systems and methods allow users to receive rewards and incentives for recycling, while still using existing recycling systems such as curbside recycling. Second, because the used vessel is actually scanned at the recycling center, that the used vessel was in fact recycled is verified. Third, because every vessel includes a unique vessel identifier, a manufacturer or retailer associated with the vessels can accurately determine what percentage of the vessels are being recycled at any given time. This may help the manufacturer test which recycling incentives, promotions, or marketing campaigns are working, and which are less successful.

In an embodiment, a system for determining that a vessel has been recycled is provided. The system includes at least one processor and a computer-readable medium. The computer readable medium storing instructions that when executed by the at least one processor, cause the at least one processor to: receive a vessel; generate a vessel identifier for the vessel; generate a computer-readable code using the generated vessel identifier; apply the generated computer-readable code to the vessel; receive the vessel identifier from a recycling facility; and in response to receiving the vessel identifier from the recycling facility, determine that the vessel has been recycled.

Embodiment may include some or all of the following features. Applying the generated computer-readable code to the vessel may include applying an RFID or NFC chip to the vessel. Applying the generated code may include etching the code on the vessel. Etching the code on the vessel may include etching the code around a circumference of the vessel. Etching the code may include laser etching the code. Applying the generated code may include printing the generated code on the vessel. The computer-readable code may include a QR code or a barcode. The computer-readable code may include a digital watermark.

In an embodiment, a method for determining that a vessel has been recycled is provided. The method may include: receiving a vessel; generating a vessel identifier for the vessel by a computing device; generating a computer-readable code using the generated vessel identifier by the computing device; applying the generated computer-readable code to the vessel; receiving the vessel identifier from a recycling facility by the computing device; and in response to receiving the vessel identifier from the recycling facility, determining that the vessel has been recycled.

Embodiments may include some or all of the following features. The method may further include: receiving the vessel identifier from a user by the computing device; determining a user account associated with the user by the computing device; and associating the user account with the vessel identifier by the computing device. The method may further include: in response to receiving the vessel identifier from the recycling facility, retrieving the user account associated with the vessel identifier by the computing device; and providing a reward to the user account by the computing device. The vessel identifier may be received from a smartphone associated with the user. The smartphone may be adapted to scan the computer-readable code and generate the vessel identifier from the computer-readable code. The vessel may be one of a can or a bottle. Receiving the vessel identifier from the recycling facility may include receiving the vessel from a scanner associated with the recycling facility. The scanner may be adapted to scan the computer-readable code on the vessel; and to generate the vessel identifier from the computer-readable code. The scanner may scan the computer-readable code from the vessel while the vessel is traveling on a conveyor belt associated with the recycling facility. The computer-readable code may be a Digimarc™ digital watermark.

In an embodiment, a method for determining that a vessel has been recycled is provided. The method includes: receiving a vessel identifier from a user by a computing device; determining a user account associated with the user by the computing device; associating the user account with the vessel identifier by the computing device; receiving the vessel identifier from a recycling facility indicating that the user has recycled a vessel identified by the vessel identifier; in response to receiving the vessel identifier from the recycling facility, retrieving the user account associated with the vessel identifier by the computing device; and providing a reward to the retrieved user account by the computing device.

Embodiments may include some or all of the following features. The vessel identifier may be received from a smartphone associated with the user. The vessel may be one of a can or a bottle. Receiving the vessel identifier from the recycling facility may include receiving the vessel from a scanner associated with the recycling facility. The scanner may be adapted to scan a computer-readable code on the vessel; and to generate the vessel identifier from the computer-readable code. The scanner may scan the computer-readable code from the vessel while the vessel is traveling on a conveyor belt associated with the recycling facility.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
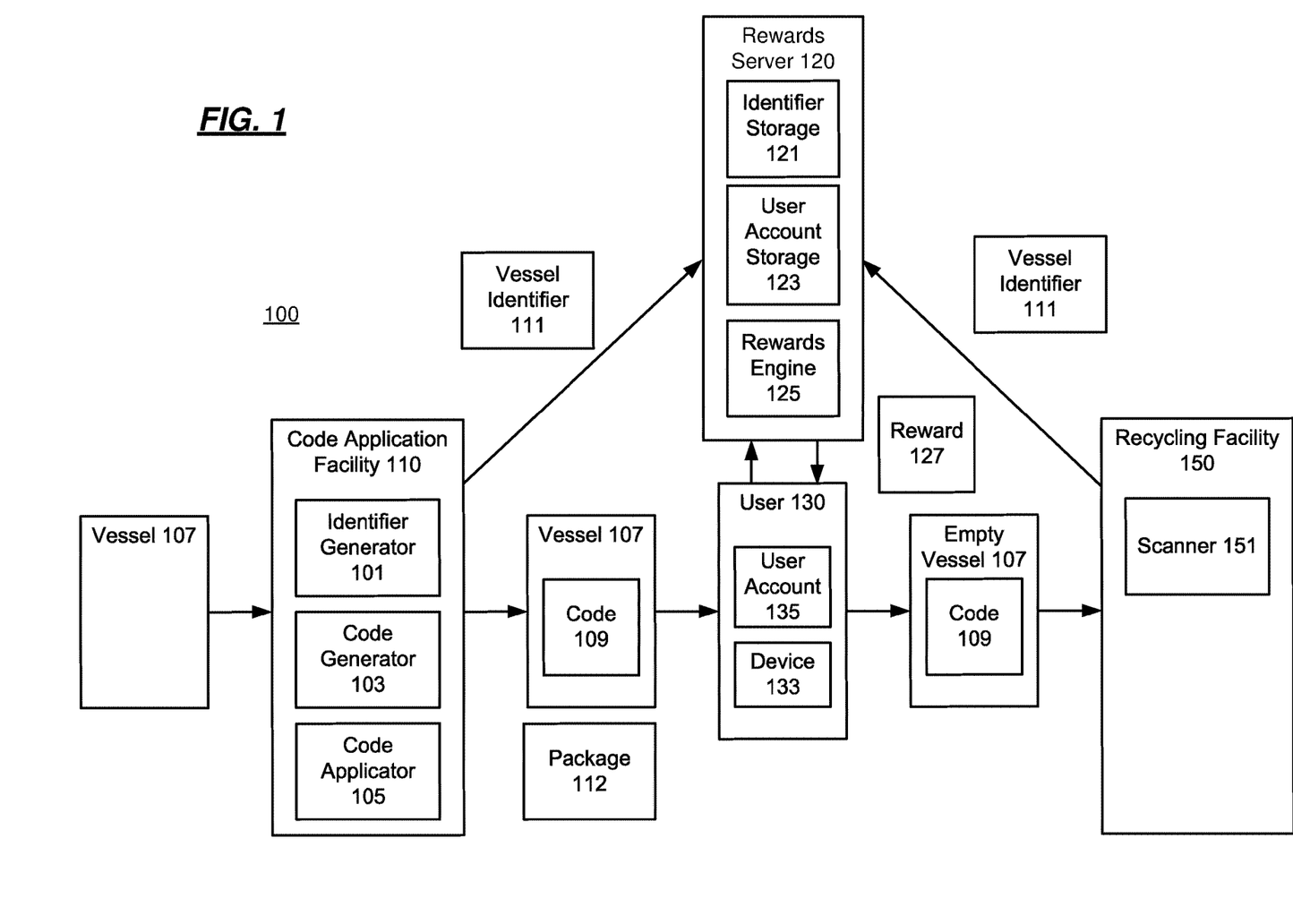
FIG. 1 is an illustration of an exemplary environment for linking vessels with user accounts, and for determining when a vessel has been recycled.

FIG. 1 is an illustration of an exemplary environment 100 for linking vessels with user accounts, and for determining when a vessel has been recycled. In the example shown, the environment 100 includes a code application facility 110 that is adapted to associate a vessel 107 with a vessel identifier 111. The code application facility 110 may include several components including, but not limited to, an identifier generator 101, a code generator 103, and a code applicator 105. More or fewer components may be supported. Some or all of the components of the code application facility 110 may be implemented together or separately using a general-purpose computing device such as the computing device 900 illustrated with respect to FIG. 9. Depending on the embodiment, the code application facility 110 may be part of a bottling or canning facility where one or more vessels 107 such as bottles or cans are filled.

The identifier generator 101 may generate a vessel identifier 111 for each vessel 107 that is received by the code application facility 110. Vessels 107 may include any container that is capable of holding a liquid or a solid. Example vessels 107 may include cans and bottles (e.g., cans or bottles used to hold soft drinks, water, alcohol, soups, vegetables, frozen or concentrated juices, or other liquids), and cartons (e.g., cartons using to hold milk, juices, eggs, soups, and other liquids). Vessels 107 may include refillable and/or returnable vessels as well as single-use vessels. Other types of vessels or containers may be supported.

The vessel identifier 111 may be a unique number that identifies the vessel 107. Depending on the total number of vessels 107 that are expected to be generated, the vessel identifier 111 may be between 20 and 30 digits in length. Other size vessel identifiers 111 may be used. The vessel identifier 111 may be all numbers, or some combination of numbers, letters, and/or other symbols or characters, for example.

In some embodiments, the identifier generator 101 may generate the vessel identifier 111 using a function. Alternatively, the identifier generator 101 may generate the vessel identifier 1111 by selecting a next vessel identifier 111 from a list of vessel identifiers 111 that have been provided to the identifier generator 101.

After generating the vessel identifier 111, the identifier generator 101 may store the vessel identifier 111 and may transmit or provide the vessel identifier 111 to a rewards server 120. The operation and components of the rewards server 120 are described further below.

The code generator 103 may generate a code 109 that encodes the vessel identifier 111. The code 109 may be a computer-readable code such as a bar code, QR code, or a digital watermark. An example digital watermark includes the Digimarc™ digital watermark. In some embodiments, the code 109 may provide sufficient capacity to encode at least the vessel identifier 111, may be quickly read regardless of the orientation and/or position of the associated vessel 107, and may have sufficient redundancy so that the code 109 can be read even where the associated vessel 107 is damaged or otherwise incomplete. The code 109 may also be innocuous such that it is not easily perceived by a consumer of the vessel 107 and does not interfere with any branding or labeling associated with the vessel 107. The code 109 generated by the code generator 103 may be stored or provided in a variety of file formats including PDF and bitmap, for example.

The code applicator 105 may apply the generated code 109 to the vessel 107. The code applicator 105 may apply the generated code 109 to the vessel 107 in a variety of ways including ink depositing, laser etching, and heat transfer. Other methods may be used.

In some embodiments, the code applicator 105 may apply the generated code 109 such that the code 109 is applied around a circumference or perimeter of the vessel 107. This is to ensure that the code 109 can be read or scanned by a computing device regardless of the orientation or position of the vessel 107. In order to facilitate the application of the code 109 in this manner, in some embodiments, the vessel 107 may be rotated as the code applicator 105 applies the code 109. Alternatively, the vessel 107 may be stationary and the code applicator 105 may rotate around the vessel 107 as the code 109 is applied. The same code 109 may be applied at multiple locations of the vessel 107.

For a vessel 107 such as a metal can, the code 109 may be repeatedly applied by the code applicator 105 about the circumference of the can, may be repeatedly applied along the entire length of the cylindrical region of the can, or may be repeatedly applied to any portion or portions of the length of the cylindrical region of the can. The amount or percentage of the surface on the areas of the can that are covered by the code(s) 109 may vary and may be selected by the manufacturer of the vessel 107.

For a vessel 107 such as a plastic bottle, the code 109 may be repeatedly applied by the code applicator 105 on or around the circumferences of various portions of the bottle including some or all of the cap, finish, neck, shoulder, body (which may include a label panel, vacuum panels, or other decorative or functional features), pinch, and base. The code 109 may be applied to each portion of the bottle with a same density, or the density of the code 109 may vary based on the particular portions of the bottle that they are applied to.

Figure 2:
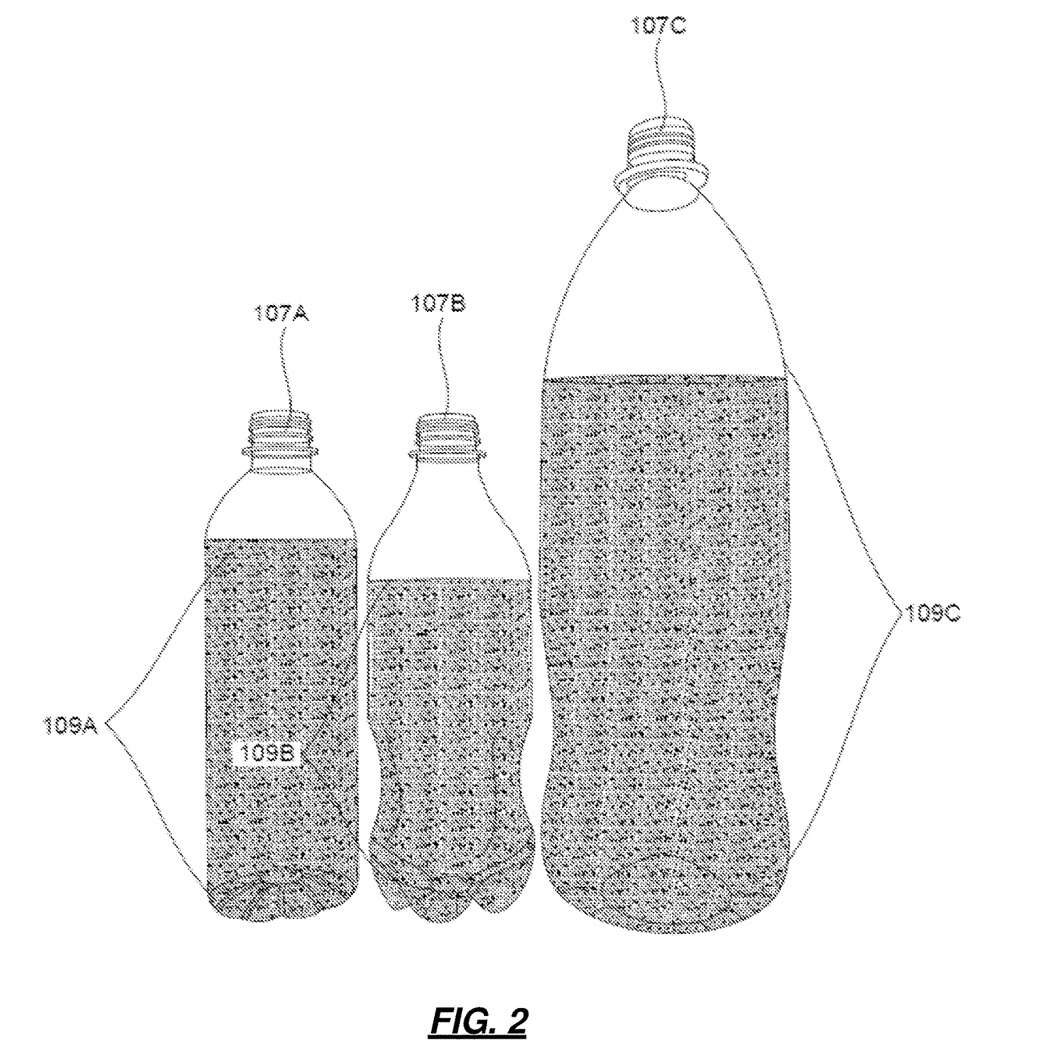
FIG. 2 is an illustration of several vessels with applied codes.

For example, FIG. 2 is an illustration of three vessels 107 (i.e., the vessels 107A-107C) with codes 109 (i.e., the codes 109A-C) applied to the surface of each vessel 107. In the example shown, the vessels 107 are plastic bottles and each code 109 is a digital watermark that is etched into the surface of each plastic bottle. Each code 109 comprises a plurality of dots that can be scanned or read by a computer to recover the encoded vessel identifier 111. The code 109 on each bottle extends completely around the circumference of the exterior surface of the bottle. Note that in the examples shown in FIG. 2, the dots or markings of the code 109 appear as black dots that are clearly visible on the exterior of each vessel, however, this is for illustrative purposes only. As described above, the dots or markings that comprise each code 109 may be faint and difficult to see.

Returning to FIG. 1, after applying the code 109 to the vessel 107, the vessel 107 may be further processed for sale or distribution to one or more users 130. This processing may include adding labels or other decorations, and incorporation into one or more other packages 112 (e.g., six or 12 packs). Note, that the code applicator 105 may apply the code 109 to the vessel before or after the vessel 107 is filled with a liquid or other product.

In some embodiments, in addition to the code 109, one or more other codes may be applied to the vessel 107. The one or more other codes may be applied to locations such as a label applied to the vessel 109 or under a cap of the vessel 109. The one or more other codes 109 may encode the same vessel identifier 111 or may otherwise be associated with the vessel identifier 111.

The one or more other codes may be a different type of codes than the code 109. The other code may be a code that is meant to be recognized and scanned by a user 130 or consumer of the vessel 107. Accordingly, a highly visible coding scheme such as QR may be used. As described above, the code 109 may be a digital watermark that is designed to be innocuous and therefore the user 130 may have a difficult time locating the code 109 on the vessel 107.

In some embodiments, the vessel 107 may be incorporated into a package 112 of multiple vessels 107 such as a six pack or a 12 pack. In these embodiments, a code (such as a QR code) may be applied to the exterior of the package 112. The other code may then be associated with each of the vessel identifiers 111 of the vessels 107 that are part of the package 112.

In some embodiments, in addition to, or instead of the code 109, each vessel 107 or package 112 may be associated with one or more RFID tags (or NFC tags). Each RFID tag may emit a unique identifier (and other information) when they come within range of an RFID reader. The unique identifier emitted by the RFID tag associated with a vessel 107 may be the same as the vessel identifier 111 or may be otherwise associated with the vessel identifier 111. Where the RFID tag is applied to a package 112, the unique identifier emitted by the RFID tag may be associated with the vessel identifiers 111 of each of the vessels 107 in the package 112. Note that in some embodiments the RFID chip may be used by the package 112, while each of the vessels 107 in the package 112 has its own unique code 109. Other low-power wireless technologies for providing codes such as Bluetooth may be used.

The rewards server 120 may include several components including, but not limited to, an identifier storage 121, a user account storage 123, and a rewards engine 125. More or fewer components may be supported. Some or all of the components of the rewards server 120 may be implemented together or separately using a general-purpose computing device such as the computing device 900 illustrated with respect to FIG. 9. Note that while shown separate from the code application facility 110 in FIG. 1, in some embodiments, the rewards server 120 may be a component of the code application facility 110.

The rewards server 120 may receive vessel identifiers 111 from the code application facility 110 and may store the vessel identifiers 111 in the identifier storage 121. Other information may be stored with each vessel identifier 111 such as the date when the associated vessel 107 was produced, the location of where the associated vessel 107 was produced, the brand or product associated with the vessel 107, and a destination for the vessel 107 (e.g., what store or retail location will ultimately receive the generated vessel 107). As may be appreciated such information may be used to generate statistics about each vessel 107 such as what locations are more likely to recycle vessels 107, how long does it take on average before a vessel 107 is recycled, what brands or products are most likely to be recycled, etc.

The rewards server 120 may further allow one or more users 130 (e.g., consumers of the products contained in the vessels 107) to create one or more user accounts 135. Depending on the embodiment, a user 130 may use a device 133 to create a user account 135. The device 133 may include a smartphone, tablet computer, videogame console, or any other computing device such as the computing device 900 illustrated with respect to FIG. 9.

The user 130 may create a user account 135 by visiting a webpage associated with the rewards server 120, or by downloading an application or "app" associated with the rewards server 120. The user 130 may then provide information such as their name and email address, and the rewards server 120 may then create a user account 135 for the user 130. The generated user accounts 135 may be stored by the rewards server 120 as part of the user account storage 123.

The user 130 may interact with a brand associated with the rewards server 120 and/or vessel 107 using the user account 135. For example, the rewards server 120 may use the user account 135 to periodically provide the user with information about the associated brand, information about one or more promotions or contests, and other incentives.

Depending on the embodiment, the user 130 may use the user account 135 to access apps associated with the brand such as branded games including virtual reality and augmented reality applications.

The rewards engine 125 may provide one or more rewards 127 to users 130 to encourage them to interact with the brand and recycle their empty vessels 107. The rewards 127 may include coupons or discounts that may be provided to the user 130 (e.g., emailed), and monetary or cash incentives. The rewards 127 may further include badges, points, or virtual trophies that may be stored in the user account 135 associated with the user 130 and/or displayed when the user 130 interacts with other users in chat rooms, message boards, or other social networking functionality provided by the rewards server 120.

When a user 130 purchases or receives a vessel 107, the user 130 may use their device 133 (through an app provided by the rewards server 120) to scan or capture an image of the vessel 107. The device 133 may then locate the code 109 in the image and may process the code to extract the vessel identifier 111 from the code 109. Note that the user may scan or capture an image of the vessel 107 before or after the user 130 has consumed some or all of the contents of the vessel 107. Alternatively, the vessel 107 may have an associated RFID chip and the user device 133 may receive the vessel identifier 111 (or a proxy for the vessel identifier 111) from the RFID chip.

Figure 3:
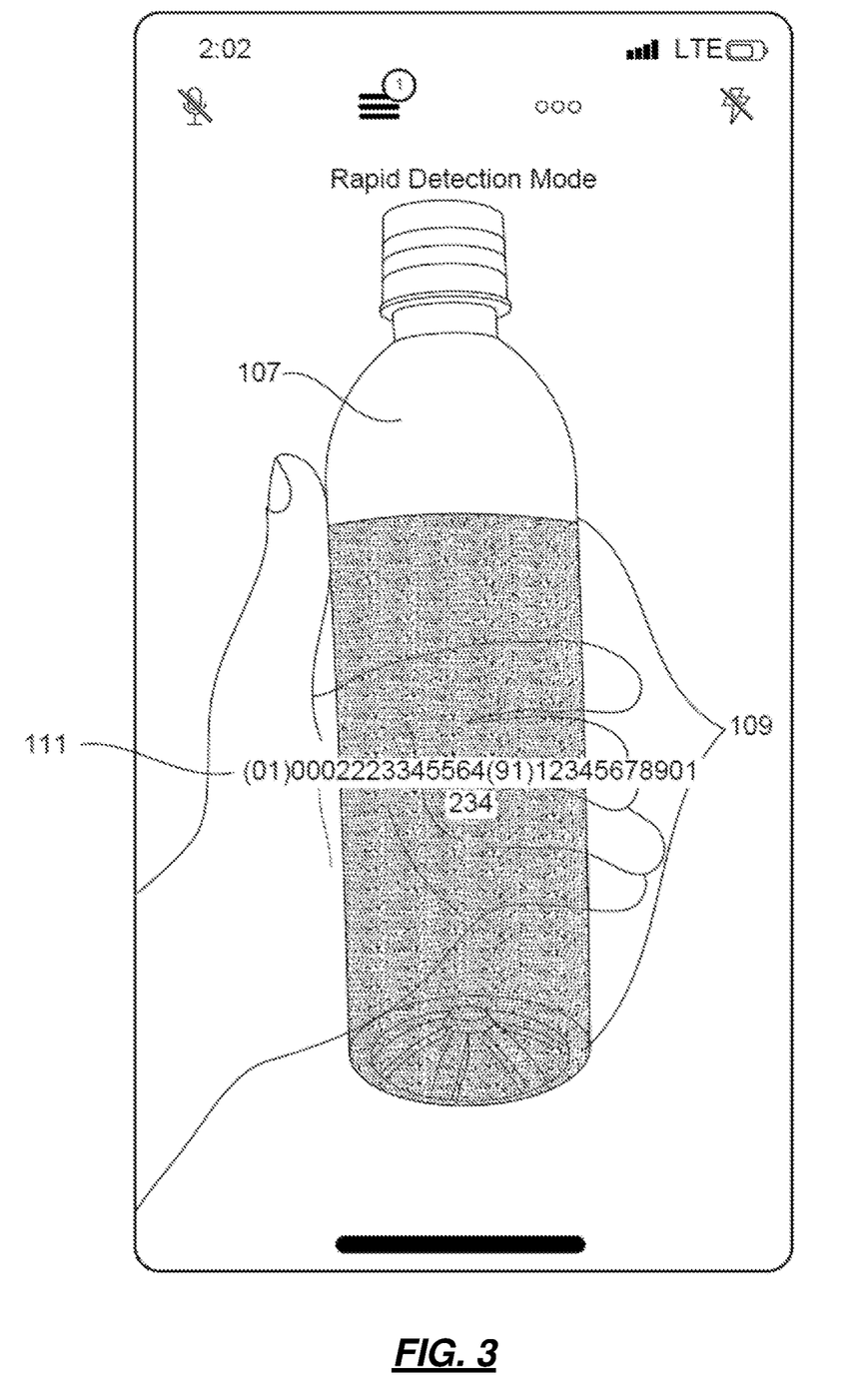
FIG. 3 is an illustration of a screenshot of a device taking a picture of a vessel and extracting a vessel identifier from a code applied to the vessel.

For example, FIG. 3 shows a screen shot of a device 133 taking a picture of a vessel 107. The screen shot includes the code 109 that is etched into the vessel 107. In the example shown, the device 133 has extracted the vessel identifier 111 (e.g., "(01)0002223345564(91)12345678901234") from the code 109 and displayed it to the user 130. Note that depending on the embodiment, the vessel identifier 111 may or may not be displayed to the user 130.

Returning to FIG. 1, after the vessel identifier 111 has been extracted from the code 109 (or RFID chip), the device 133 may provide the vessel identifier 111 (and an indicator of the user account 135) to the rewards engine 125. The rewards engine 125 may verify that the vessel identifier 111 matches a vessel identifier 111 provided by the code application facility 110 and may further verify that the vessel identifier 111 has not already been provided by another user 130 (or has already been recycled). If verified, the rewards engine 125 may then link or associate the vessel identifier 111 with the user account 135 in the user account storage 123.

Note that the code that is scanned by the device 133 on the vessel 107 may not necessarily be the same as the code 109. As described above, in addition to the code 109 etched or printed on the vessel 107, the vessel 107 may include one or more other codes printed on other locations of the vessel 109 such as under a cap or on a label that has been applied to the vessel 107. The other codes may include QR codes or bar codes, for example. These other codes may include the same vessel identifier 111 as the code 109, or may include an identifier that is linked to, or known to be associated with the vessel identifier 111 by the rewards server 120.

Where the user 130 purchases the vessel 107 as part of a package 112, the user 130 may use the device 133 to scan the code 109 (or other code) associated with the package 112. The rewards engine 125 may then associate the user account 135 with all of the vessel identifiers 111 that are known to be part of the package 112. Alternatively, the device 133 may receive the code from an RFID chip associated with the package 112.

In some embodiments, before the device 133 provides the vessel identifier 111 to the rewards server 125 and the vessel identifier 111 is linked to the user account 135, the device 113 may first verify that the associated vessel 109 has been purchased. In one embodiment, the vessel 107 may include a code under the bottle cap or the back of the label that can only be read or scanned by the user 130 after purchasing. This code may be verified by the device 113 before the vessel identifier 111 is provided to the rewards server 125. As may be appreciated, verifying the purchase of the vessel 107 may prevent a malicious user from scanning multiple vessels 107 in a retail location that they did not purchase.

In some embodiments, before the device 133 provides the vessel identifier 111 to the rewards server 125 and the vessel identifier 111 is linked to the user account 135, the device 113 may first verify that the associated vessel 109 has been drank or is empty. For example, the device 113 may request that the user 130 scan or take a picture of the vessel 107 (e.g., a bottle) and may use computer vision or other image processing techniques to verify that the vessel 107 is empty or mostly empty. In another example, the device 113 may request that the user 130 place the vessel 107 on the device 113 and may use the touch screen functionality associated with the device 113 to estimate the weight of the vessel 107. If the device 113 verifies that the vessel 107 is likely empty, or partially empty, the device 113 may provide the vessel identifier 111 to the rewards server 125.

After the user 130 has consumed some or all of the contents of the vessel 107, the user may provide the empty vessel 107 to a recycling facility 150. As used herein a recycling facility 150 may be any business or entity that receives and processes recyclable materials such as vessels 107. The user 130 may provide the empty vessel 107 directly to the recycling facility 150, or indirectly by depositing the empty vessel 107 in a recycling receptacle.

The recycling facility 150 may include a scanner 151 that is configured to scan or capture an image of the empty vessel 107 at some point during processing by the recycling facility 150. The scanner 151 may be a specialized scanner that is configured to quickly capture an image of the empty vessel 107 as it passes through the recycling facility 150. Depending on the embodiment, there may be multiple scanners 151 in the recycling facility 150 or a single scanner 151 in the recycling facility 150. Some portions of the scanner 151 may be implemented using a computing device such as the computing device 900 illustrated with respect to FIG. 9. In embodiments with RFID tags, the scanner 151 may be adapted to read the RFID tag associated with each vessel 107.

Figure 4:
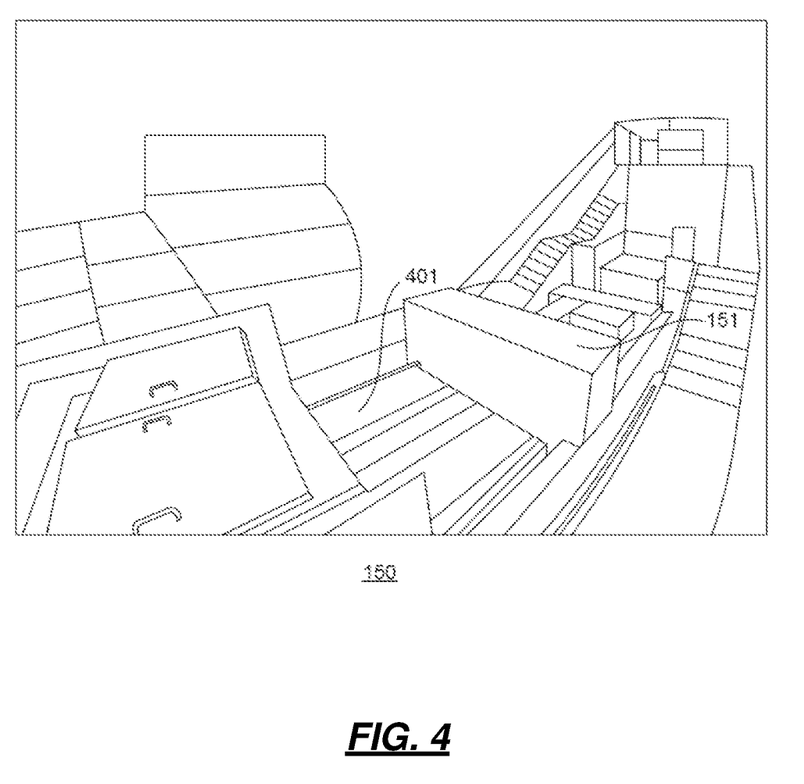
FIGS. 4 and 5 are illustrations of an example scanner in a recycling facility.
Figure 5:
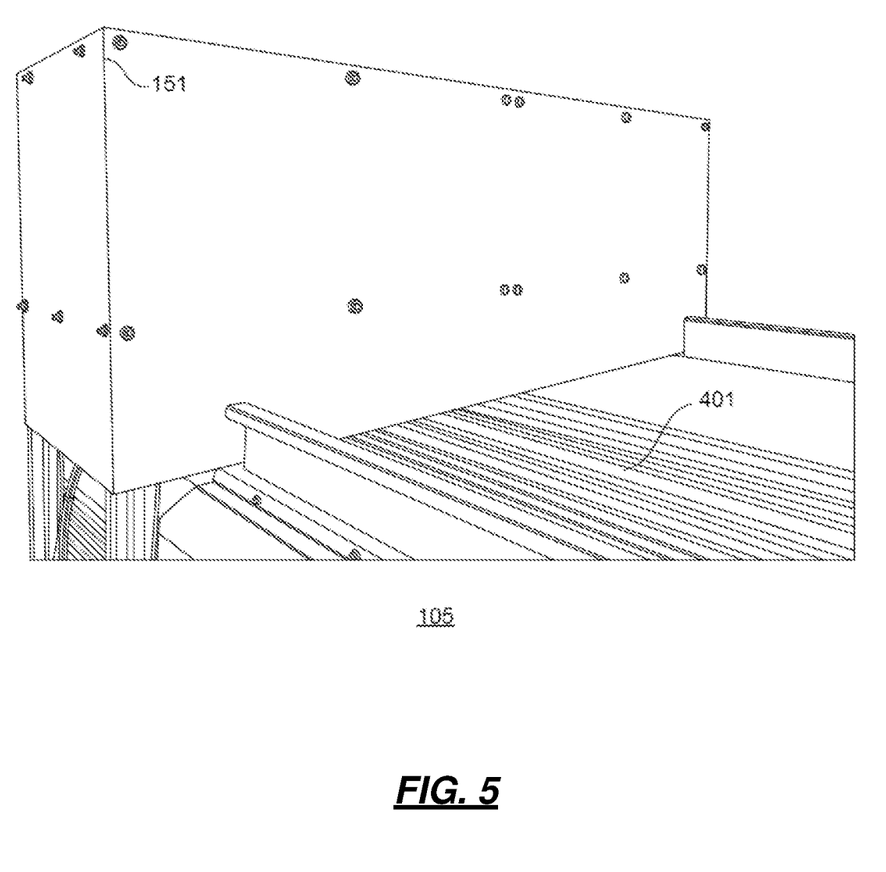

FIG. 4 shows an illustration of an example scanner 151 in a recycling facility 150. As shown the scanner 151 is placed above a conveyor belt 401 that carries vessels 107 through the recycling facility 150. As vessels 107 pass under the scanner 151, the vessels 107 are scanned and/or an image of each vessel 107 is captured by the scanner 151. The vessel identifier 111 is then extracted from the code 109 in the image of the vessel 107. FIG. 5 shows another illustration of the example scanner 151 above the conveyor belt 401.

As described above, the code 109 can be read or scanned regardless of the orientation or position of the vessel 107. Thus, no special care is required when the empty vessels 107 pass through the recycling facility 150. For example, no additional employees are required to manually scan each vessel 107, or to ensure that the vessels are properly positioned as they travel along a conveyor belt associated with the recycling facility 150. Accordingly, any existing recycling facility 150 may incorporate the vessel 107 scanning technology described herein.

Note that the scanner 151 is not limited to being placed in the recycling facility 150. For example, a scanner 151 could be placed at or around the opening of a recycling receptacle. As users 130 throw empty or used vessels 107 into the receptacle the scanner 151 may scan the codes 109 associated with each vessel 107. In another example, a scanner 151 could be placed in a sanitation vehicle such as a garbage truck that collects recyclable material. In another example, the scanner 151 could be placed inside of a reverse vending machine.

Returning to FIG. 1, after the scanner 151 extracts the vessel identifier 111 from the code 109 of the empty vessel 107 (or RFID chip), the scanner 151 may provide the vessel identifier 111 to the rewards server 120. The rewards server 120 may then mark the received vessel identifier 111 in the identifier storage 121 as having been recycled. Depending on the embodiment, the scanner 151 may provide additional information along with the vessel identifier 111 such as a time and date of when the empty vessel 107 was scanned and a location of the recycling facility 150. The additional information may be stored by the rewards server 120 in the identifier storage 121 and may be used to provide statistics such as how long the vessel 107 took to be recycled, and how far the vessel 107 traveled before it was recycled.

The rewards engine 125 may, when a vessel identifier 111 is received from the recycling facility 150 indicating the associated vessel 107 was recycled, determine if the received vessel identifier 111 matches any vessel identifiers 111 that have been previously linked or associated with a user account 135. For example, the rewards engine 125 may search the user account storage 123 for any user accounts 135 that are linked to the vessel identifier 111. Generally, there may be only one user account 135 that is linked to a vessel identifier 111.

In some embodiments, the rewards engine 125, as part of determining if a received vessel identifier 111 matches any vessel identifiers 111 that have been previously linked or associated with a user account 135, may verify that the received vessel identifier 111 has not been previously received from the same or different recycling facility 150. If the received vessel identifier 111 has been previously received then the received vessel identifier 111 may be discarded or otherwise ignored by the rewards engine 125. This may prevent a malicious user from repeatedly "recycling" the same vessel 107 and may handle the scenario of a single vessel 107 being scanned multiple times at the same recycling facility 150 during processing.

The rewards engine 125 may provide a reward 127 to the user account 135 associated with the vessel identifier 111. The reward 127 may include a variety of incentives or positive reinforcements to encourage the users 130 to recycle vessels 107. As a most basic example, the reward 127 may be a message (e.g., SMS or email) that is sent to the user 130. The reward 127 may further include coupons or discounts that can be used to purchase additional products associated with a brand corresponding to the vessel 107.

In some embodiments, the reward 127 may be part of a rewards or incentives program associated with the brand corresponding to the vessel 107. The user account 135 may receive some number of points for each vessel 107 that they recycle. These points may then be redeemed by the user 130 associated with the user account 135 in exchange for coupons, products such as beverages, merchandise such as t-shirts, stickers, and hats, and virtual items such as trophies and badges that may be associated with the user account 135.

In some embodiments, the rewards 127 may be incorporated into a virtual environment provided by the rewards engine 125 where users may communicate with one another in a game, messaging, or chat environment. In the virtual environment the users may receive rewards 127 such as achievements for recycling certain threshold number of vessels 107 or recycling a variety of vessel 107 types or brands. These rewards 127 can be displayed next to the user's name or avatar in the virtual environment. Other types of rewards 127 may be supported.

Note that that code 109 and recycling systems described herein may have additional uses outside of the rewards program. As one example, the codes 109 affixed to each vessel 107 may be used to increase the speed and accuracy of recycling. When a vessel identifier 111 is generated the type or material used to create the corresponding vessel 107 (e.g., glass, type of plastic, or aluminum) may be incorporated into, or associated with, the vessel identifier 111. Later, when the code 109 on the vessel 107 is scanned at the recycling facility 150, the extracted vessel identifier 111 may be used to sort the vessel 107 into the appropriate recycling path or process. As another example, as the use of the codes 109 grows, producers of vessels 107 could use the recycling data and statistics collected for variety of purposes such as compliance with government regulations related to recycling, and for promoting or advertising the sustainability of the vessels 107.

As may be appreciated, the code 109 may also be used to incentivize the recycling of vessels 107 by individuals other than the consumer of the products associated with the vessels 107. In particular, because of the possibility of the rewards 127, users would be incentivized to seek out vessels 107 for recycling. For example, food or grocery delivery drivers may offer to collect and recycle the empty vessels 107 in exchange for the associated rewards. Visitors to parks, beaches, or other recreation areas may be incentivized to hunt or look for discarded vessels 107 to recycle. To encourage or promote such recycling, local parks or towns could offer "kickers" or additional incentives and rewards 127 for vessels 107 collected during particular dates or time periods.

Figure 6:
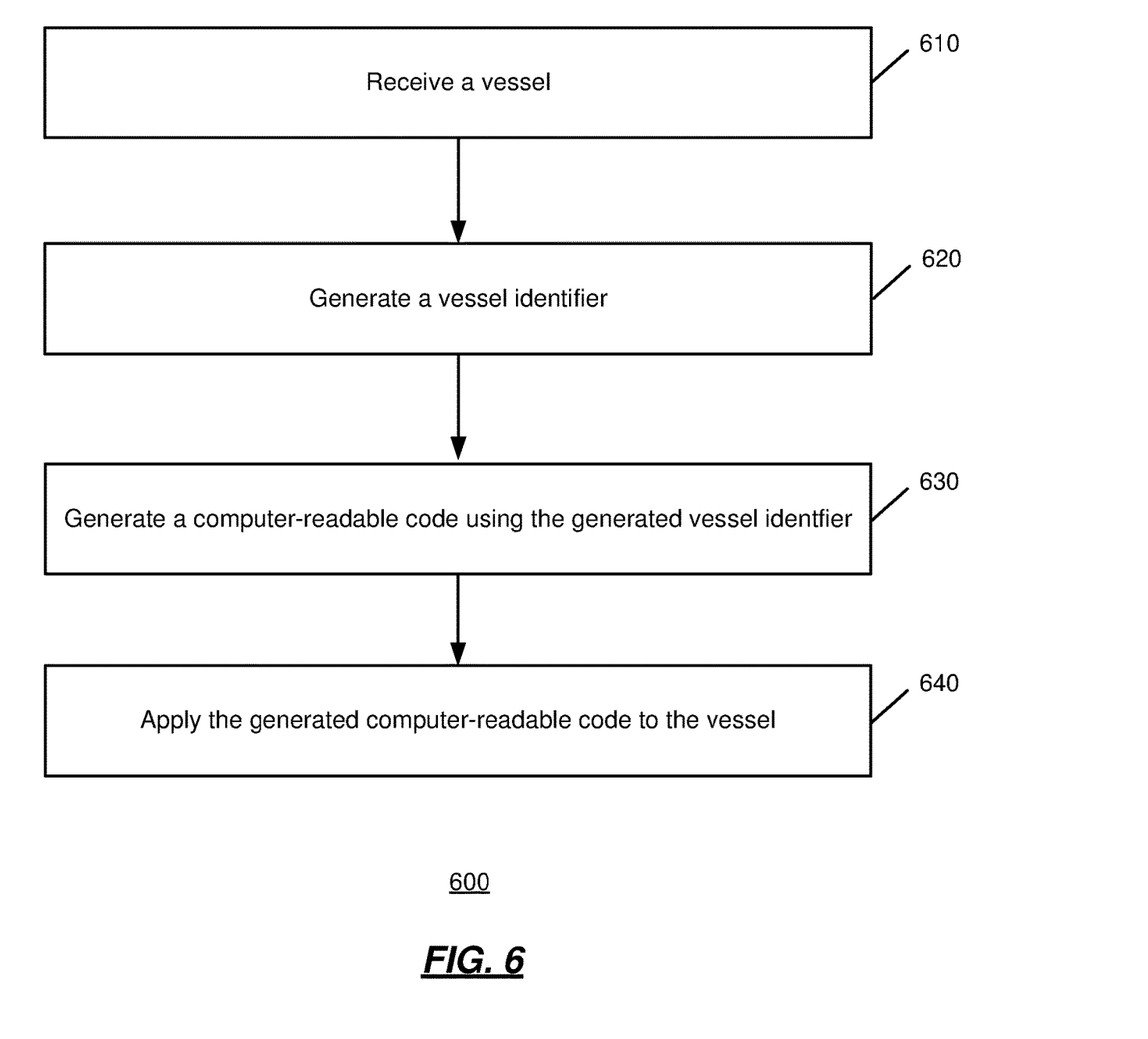
FIG. 6 is an illustration of a method for applying a code to a vessel.

FIG. 6 is an illustration of a method 600 for applying a code to a vessel. The method 600 may be performed by the code application facility 110.

At 610, a vessel is received. The vessel 107 may be received by the code application facility 110. The vessel 107 may be a bottle or a can that is adapted to hold a liquid or other materials. The received vessel 107 may be filled or may be empty.

At 620, a vessel identifier is generated. The vessel identifier 111 may be generated by the identifier generator 101 of the code application facility 110 for the received vessel 107. The vessel identifier 111 may uniquely identify the vessel 107 and may include other information such as the location of where the vessel 107 was or will be filed, and the current time and/or date. The identifier generator 101 may generate the vessel identifier 111 using a function or may select a next vessel identifier 111 from a list of vessel identifiers 111.

At 630, a computer-readable code is generated using the generated vessel identifier. The code 109 may be generated by the code generator 103 of the code application facility 110. The code 109 may be a variety of codes such as bar codes and digital watermarks. The code 109 may be a code than can be read by a computer from a variety of angles and directions, and that includes sufficient redundancy such that the code can be read even where portions of the vessel have been destroyed, damaged, or are otherwise obscured. An example code is the Digimarc™ digital watermark, other codes 109 may be used.

At 640, the generated computer-readable code is applied to the vessel. The code 109 may be applied to the vessel 107 by the code applicator 105. Depending on the embodiment, the code 109 may be applied to the vessel 107 by etching the code 109 onto the vessel 107 using a laser, or by writing the code 109 onto the vessel 107 using ink. Other methods may be used. The code 109 may be repeatedly placed along a circumference of the vessel 107. This may allow the code 109 to be read or scanned by a computing device regardless of the orientation or position of the vessel 107.

Figure 7:
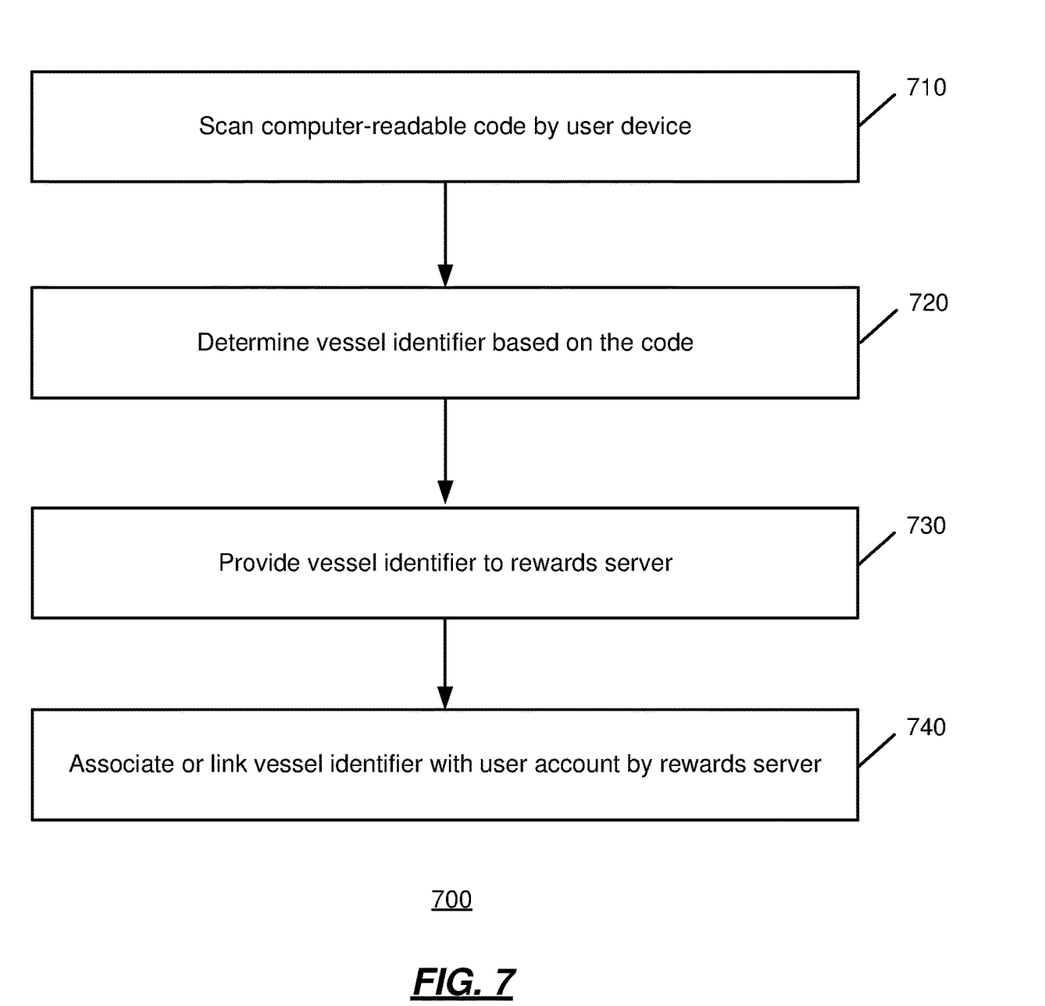
FIG. 7 is an illustration of a method for linking a vessel identifier to a user account.

FIG. 7 is an illustration of a method 700 for linking a vessel identifier to a user account. The method 700 may be performed by the rewards server 120 and the device 133.

At 710, a computer-readable code is scanned. The code 109 may be applied to the surface of a vessel 107 such as a bottle or a can. The code 109 may be scanned by a camera or other sensor associated with a device 133. The device 133 may be a smartphone, tablet, video game console or any other computing device associated with a user 130.

In some embodiments, the user 130 may have purchased the vessel 107. At some time before or after consuming the contents of the vessel 107, the user may have opened an app associated with the brand or manufacturer of the vessel 107. The user 130 may have logged into the app using a user account 135 associated with the user 130. The app may have directed the user to scan or take a picture of the empty, or partially empty, vessel 107 with their device 133.

At 720, a vessel identifier is determined based on the code. The vessel identifier 111 may be determined by extracting the vessel identifier 111 from the code 109 on the vessel 107. In some embodiment, the vessel identifier 111 may be extracted by the device 133 (or the app running on the device 133). Alternatively, the device 133 may provide an image or scan of the code 109 to the rewards server 120, and the rewards server 120 may determine the vessel identifier 111 from the code 109.

At 730, the vessel identifier is provided. The vessel identifier 111 may be provided by the device 133 to the rewards server 120.

At 740, the vessel identifier is associated or linked to the user account. The vessel identifier 111 may be linked or associated with the user account 135 of the user 130 that scanned or provided the vessel identifier 111.

Figure 8:
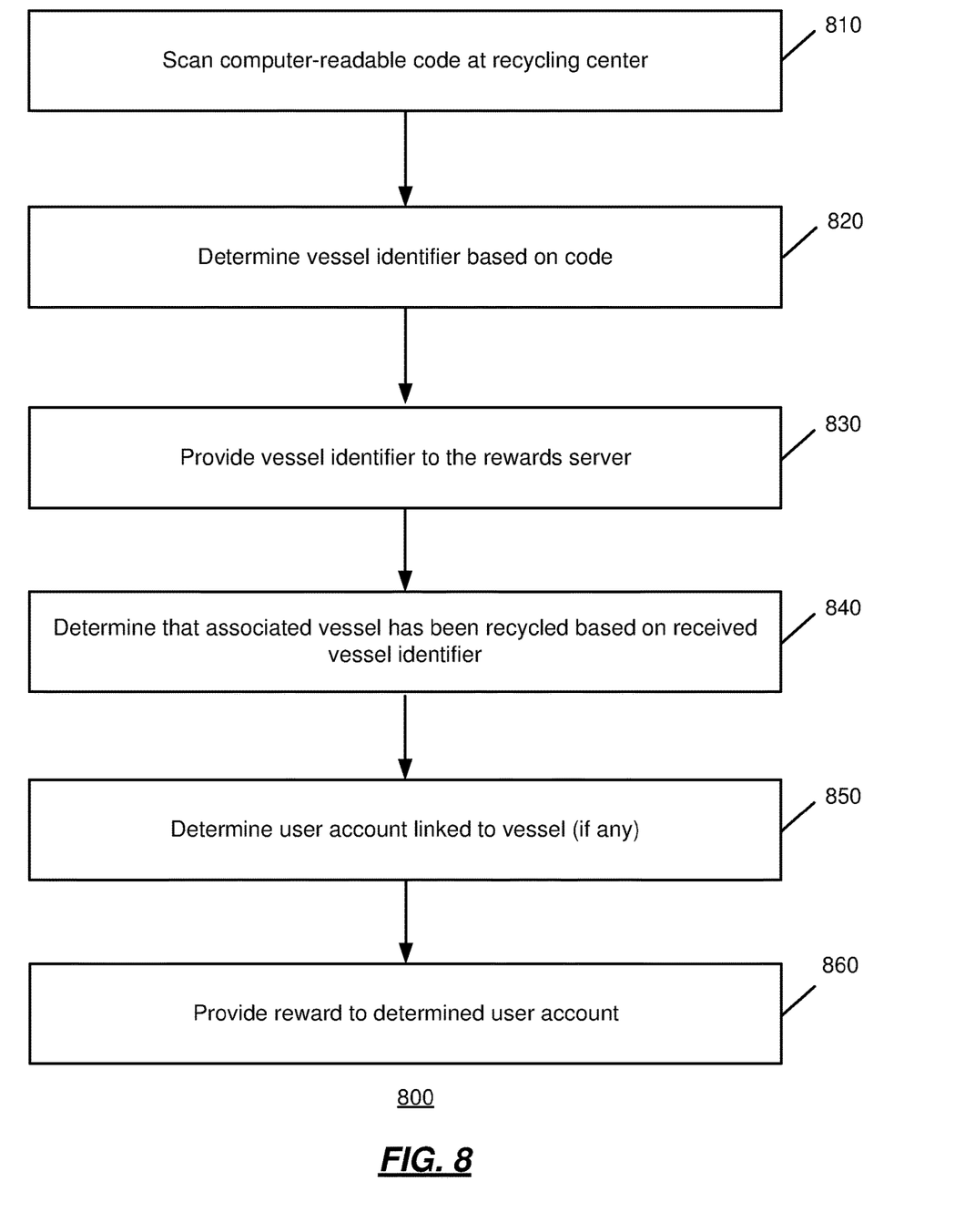
FIG. 8 is an illustration of a method for providing one or more rewards in exchange for recycling a vessel.

FIG. 8 is an illustration of a method 800 for providing one or more rewards in exchange for recycling a vessel. The method 800 may be performed by the recycling facility 150 and the rewards server 120.

At 810, the computer-readable code is scanned. The code 109 on a vessel 107 may be scanned by a scanner 151 associated with the recycling facility 150. For example, the vessel 107 may be on a conveyor belt of the recycling facility 150 on which various vessels 107 are placed as they are processed for recycling. The scanner 151 may be placed above or adjacent to the conveyor belt.

At 820, a vessel identifier is determined based on the code. The vessel identifier 111 may be determined from the code 109 by the scanner 151. Any method for extracting a sequence from a code 109 may be used.

At 830, the vessel identifier is provided to the rewards server. The vessel identifier 111 may be provided (e.g., transmitted) by the scanner 151 to the rewards server 120.

At 840, that the vessel has been recycled is determined. That the vessel 107 has been recycled may be determined by the rewards server 120. In some embodiments, the rewards server 120 may locate the vessel identifier 111 in the identifier storage 121 and may mark the vessel identifier 111 as being recycled. The rewards server 120 may include additional information such as the time and/or date when the vessel 107 was likely recycled and the location of the recycling facility 150 that the vessel identifier 111 was received from.

At 850, a user account linked to the recycled vessel is determined. The user account 135 may be determined by the rewards server 120 searching for a user account 135 in the user account storage 123 that is linked to, or associated with, the received vessel identifier 111. As described above, a user account 135 may have been linked with the vessel identifier 111 when the user 130 associated with the user account 135 scanned the code 109 of the vessel 107 corresponding to the vessel identifier 111. Note that some vessel identifiers 111 may not have been scanned by a user 130 before being recycled.

At 860, a reward is provided to the determined user account. The reward 127 may be provided the rewards engine 125 to the user account 135. Depending on the embodiment, the reward 127 may be a coupon, congratulatory message, or some number of points that may be exchanges for other goods and services provided by the rewards server 120.

Figure 9:
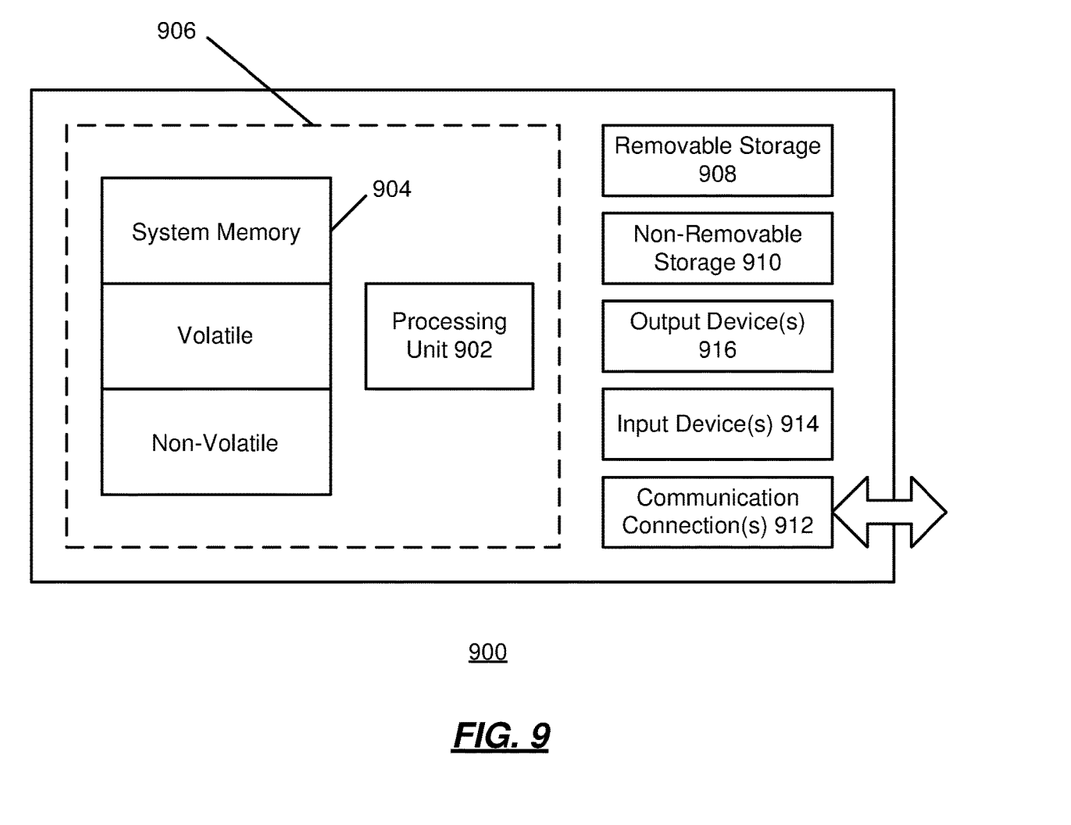
FIG. 9 shows an exemplary computing environment in which example embodiments and aspects may be implemented.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for determining that a vessel has been recycled comprising:
   at least one recycling facility scanner;
   at least one processor in electronic communication with the at least one recycling facility scanner located in a recycling facility; and
   a computer-readable medium storing instructions that when executed by the at least one processor, cause the at least one processor to:
   receive a vessel;
   generate a vessel identifier for the vessel, the vessel identifier being associated with or defining a material type;
   generate a computer-readable code using the generated vessel identifier;
   apply the generated computer-readable code to the vessel; and
     in response to receiving an indication of the vessel identifier from the at least one recycling facility, determine that the vessel has been recycled and generate recycling statistics for the vessel,
   wherein the at least one recycling facility scanner is configured to:
   obtain, via a camera, an image of the vessel,
   extract the computer-readable code from the obtained image,
   verify a status of the vessel identifier corresponding with the computer-readable code, and
   sort the vessel into a recycling path or process at the recycling facility based, at least in part, on the extracted computer-readable code.

2. The system of claim 1, wherein applying the generated computer-readable code to the vessel comprises applying an RFID or NFC chip to the vessel.

3. The system of claim 1, wherein applying the generated computer-readable code comprises etching the computer-readable code on the vessel.

4. The system of claim 3, wherein etching the computer-readable code on the vessel comprises etching the computer-readable code around a circumference of the vessel.

5. The system of claim 4, wherein etching the computer-readable code comprises laser etching the computer-readable code.

6. The system of claim 1, wherein applying the generated computer-readable code comprises printing the generated computer-readable code on the vessel.

7. The system of claim 1, wherein the computer-readable code comprises a QR code, barcode, or digital watermark.

8. A method for determining that a vessel has been recycled comprising:
   receiving, by a computing device in electronic communication with at least one recycling facility scanner located in a recycling facility, a vessel;
   generating, by the computing device, a vessel identifier for the vessel, the vessel identifier being associated with or defining a material type;
   generating, by the computing device, a computer-readable code using the generated vessel identifier;
   applying, by the computing device, the generated computer-readable code to the vessel;
   obtaining, via a camera and by the at least one recycling facility scanner, an image of the vessel;

extracting, by the at least one recycling facility scanner, the computer-readable code from the obtained image;

verifying, by the at least one recycling facility scanner, a status of the vessel identifier corresponding with the computer-readable code;

sorting, by the at least one recycling facility scanner, the vessel into a recycling path or process at the recycling facility based, at least in part, on the extracted computer-readable code;

in response to receiving, by the computing device, an indication of the vessel identifier from the recycling facility, determining that the vessel has been recycled; and generating, by the computing device, recycling statistics for the vessel.

9. The method of claim 8, further comprises:

receiving, by the computing device, the vessel identifier from a user determining, by the computing device, a user account associated with the user and associating, by the computing device, the user account with the vessel identifier.

10. The method of claim 9, further comprising:

in response to receiving, by the computing device, the vessel identifier from the recycling facility, retrieving the user account associated with the vessel identifier and providing, by the computing device, a reward to the user account.

11. The method of claim 9, wherein the vessel identifier is received from a smartphone associated with the user.

12. The method of claim 11, wherein the smartphone is adapted to scan the computer-readable code and generate the vessel identifier from the computer-readable code.

13. The method of claim 8, wherein the vessel is one of a can or a bottle.

14. The method of claim 8, wherein receiving the vessel identifier from the recycling facility comprises receiving the vessel from a scanner associated with the recycling facility.

15. The method of claim 14, wherein the scanner is adapted to scan the computer-readable code on the vessel; and to generate the vessel identifier from the computer-readable code.

16. The method of claim 15, wherein the scanner scans the computer-readable code from the vessel while the vessel is traveling on a conveyor belt associated with the recycling facility.

17. The method of claim 8, wherein the computer-readable code comprises a Digimarc™M digital watermark.

18. A method for determining that a vessel has been recycled comprising:

receiving, by a computing device, a vessel identifier from a user, the vessel identifier being a computer-readable code that is associated with or defines a type of recycling material, obtaining, by at least one recycling facility scanner located in a recycling facility, an image of the vessel identifier;

extracting, by the at least one recycling facility scanner, the computer-readable code from the image of the vessel;

verifying, by the at least one recycling facility scanner, a status of the vessel identifier corresponding with the computer-readable code;

sorting, by the at least one recycling facility scanner, the vessel into a recycling path or process, based, at least in part, on the extracted computer-readable code determining, by the computing device, a user account associated with the user;

associating, by the computing device, the user account with the vessel identifier;

receiving, by the computing device, the vessel identifier from the recycling facility indicating that the user has recycled a vessel identified by the vessel identifier;

in response to receiving, by the computing device, the vessel identifier from the recycling facility, retrieving the user account associated with the vessel identifier;

vproviding, by the computing device, a reward to the retrieved user account; and generating, by the computing device, recycling statistics for the vessel.

19. The method of claim 18, wherein the vessel identifier is received from a smartphone associated with the user.

20. The system of claim 1, wherein the computer-readable medium further stores instructions that when executed by the at least one processor, causes the at least one processor to:

subsequent to determining that the vessel has been recycled, transmit the vessel identifier and vessel information to a rewards server, wherein the received vessel identifier and vessel information is used to generate the recycling statistics or process rewards.

* * * * *